US011803741B2

(12) United States Patent
Busch et al.

(10) Patent No.: US 11,803,741 B2
(45) Date of Patent: Oct. 31, 2023

(54) OFFLINE DETECTOR

(71) Applicant: SYNTIANT, Aliso Viejo, CA (US)

(72) Inventors: Kurt F. Busch, Laguna Hills, CA (US); Pieter Vorenkamp, Laguna Beach, CA (US); Stephen W. Bailey, Irvine, CA (US); Jeremiah H. Holleman, III, Davidson, NC (US)

(73) Assignee: SYNTIANT, Aliso Viejo, CA (US)

( * ) Notice: Subject to any disclaimer, the term of this patent is extended or adjusted under 35 U.S.C. 154(b) by 559 days.

(21) Appl. No.: 16/275,032

(22) Filed: Feb. 13, 2019

(65) Prior Publication Data
US 2019/0251426 A1 Aug. 15, 2019

Related U.S. Application Data

(60) Provisional application No. 62/630,729, filed on Feb. 14, 2018.

(51) Int. Cl.
*G06N 3/04* (2023.01)
*G06N 3/08* (2023.01)
(Continued)

(52) U.S. Cl.
CPC ............ *G06N 3/065* (2023.01); *G06N 3/042* (2023.01); *G06N 3/08* (2013.01)

(58) Field of Classification Search
CPC .......... G06N 3/0635; G06N 3/08; G06N 3/04; G06N 3/0454
See application file for complete search history.

(56) References Cited

U.S. PATENT DOCUMENTS 8,447,713 B1 * 5/2013 Gansner ................. G06N 7/005
706/20
9,020,870 B1 4/2015 Daily et al.
(Continued)

FOREIGN PATENT DOCUMENTS

WO 2006037331 A1 4/2006

OTHER PUBLICATIONS

Desai, Soham Jayesh, Mohammed Shoaib, and Arijit Raychowdhury. "An ultra-low power, "always-on" camera front-end for posture detection in body worn cameras using restricted boltzman machines." IEEE transactions on multi-scale computing systems 1.4 (2015): 187-194. (Year: 2015).*

(Continued)

*Primary Examiner* — Hal Schnee
(74) *Attorney, Agent, or Firm* — Ravi Mohan; Rutan & Tucker, LLP

(57) ABSTRACT

Provided herein is an integrated circuit including, in some embodiments, a special-purpose host processor, a neuromorphic co-processor, and a communications interface between the host processor and the co-processor configured to transmit information therebetween. The special-purpose host processor can be operable as a stand-alone processor. The neuromorphic co-processor may include an artificial neural network. The co-processor is configured to enhance special-purpose processing of the host processor through an artificial neural network. In such embodiments, the host processor is a pattern identifier processor configured to transmit one or more detected patterns to the co-processor over a communications interface. The co-processor is configured to transmit the recognized patterns to the host processor.

17 Claims, 9 Drawing Sheets

(51) Int. Cl.
G06N 3/065 (2023.01)
G06N 3/042 (2023.01)

(56) References Cited

U.S. PATENT DOCUMENTS

| | | |
|---|---|---|
| 2002/0180631 A1 | 12/2002 | Alon |
| 2003/0154175 A1 | 8/2003 | Shi et al. |
| 2012/0323832 A1 | 12/2012 | Snook et al. |
| 2013/0018833 A1* | 1/2013 | Sullivan ............... H04L 69/329 706/25 |
| 2013/0254138 A1* | 9/2013 | Kudritskiy ............... G06N 3/04 706/26 |
| 2015/0106085 A1 | 4/2015 | Lindahl |
| 2015/0127594 A1* | 5/2015 | Parada San Martin ...................... G06N 3/0454 706/16 |
| 2016/0179434 A1* | 6/2016 | Herrero Abellanas ... G06T 1/60 711/155 |
| 2016/0224892 A1* | 8/2016 | Sawada ................... G06N 3/08 |
| 2016/0328644 A1 | 11/2016 | Lin et al. |
| 2016/0379629 A1 | 12/2016 | Hofer et al. |
| 2017/0132472 A1 | 5/2017 | Tao et al. |
| 2017/0228345 A1 | 8/2017 | Gupta et al. |
| 2017/0229117 A1 | 8/2017 | van der Made et al. |
| 2018/0307912 A1* | 10/2018 | Selinger .................. G06K 9/78 |
| 2018/0322384 A1* | 11/2018 | Augustine ............... G06N 3/049 |
| 2019/0115011 A1* | 4/2019 | Khellah .................. G10L 15/02 |
| 2019/0163750 A1* | 5/2019 | Sage ..................... G05B 13/048 |
| 2019/0243890 A1* | 8/2019 | Kwatra ................. G06F 40/103 |
| 2019/0244113 A1* | 8/2019 | Ramos .................... G06N 3/08 |

OTHER PUBLICATIONS

E. Farella, M. Rusci, B. Milosevic and A. L. Murphy, "Technologies for a Thing-Centric Internet of Things," 2017 IEEE 5th International Conference on Future Internet of Things and Cloud (FiCloud), 2017, pp. 77-84, doi: 10.1109/FiCloud.2017.58. (Year: 2017).*

Rusci, Manuele, et al. "A sub-mW IoT-endnode for always-on visual monitoring and smart triggering." IEEE Internet of Things Journal 4.5 (2017): 1284-1295. (Year: 2017).*

Shah, Mohit, et al. "A fixed-point neural network architecture for speech applications on resource constrained hardware." Journal of Signal Processing Systems 90.5 (2018): 727-741. (Year: 2018).*

International Search Report and Written Opinion, PCT Application No. PCT/US2019/017873, dated Jun. 14, 2019.

Schuman, C.D. et al., "A Survey of Neuromorphic Computing and Neural Networks in Hardware", arXiv:1705.06963v1 [cs.NE] May 19, 2017.

Extended European Search Report, EP Application No. 19754188.1, dated Feb. 4, 2022.

* cited by examiner

OFFLINE DETECTOR

PRIORITY

This application claims the benefit of priority to U.S. Provisional Patent Application No. 62/630,729, filed Feb. 14, 2018, titled "Offline Detector," which is hereby incorporated by reference into this application in its entirety.

FIELD

The field of the present disclosure generally relates to neuromorphic computing. More particularly, the field of the invention relates to an apparatus and a method for a low-power, always-on pattern detector.

BACKGROUND

Traditional central processing units ("CPUs") process instructions based on "clocked time." Specifically, CPUs operate such that information is transmitted at regular time intervals. Based on complementary metal-oxide-semiconductor ("CMOS") technology, silicon-based chips may be manufactured with more than 5 billion transistors per die with features as small as 10 nm. Advances in CMOS technology have been parlayed into advances in parallel computing, which is used ubiquitously in cell phones and personal computers containing multiple processors.

However, as machine learning is becoming commonplace for numerous applications including bioinformatics, computer vision, video games, marketing, medical diagnostics, online search engines, etc., traditional CPUs are often not able to supply a sufficient amount of processing capability while keeping power consumption low. In particular, machine learning is a subsection of computer science directed to software having the ability to learn from and make predictions on data. Furthermore, one branch of machine learning includes deep learning, which is directed at utilizing deep (multilayer) neural networks.

Currently, research is being done to develop direct hardware implementations of deep neural networks, which may include systems that attempt to simulate "silicon" neurons (e.g., "neuromorphic computing"). Neuromorphic chips (e.g., silicon computing chips designed for neuromorphic computing) operate by processing instructions in parallel (e.g., in contrast to traditional sequential computers) using bursts of electric current transmitted at non-uniform intervals. As a result, neuromorphic chips require far less power to process information, specifically, artificial intelligence ("AI") algorithms. To accomplish this, neuromorphic chips may contain as much as five times as many transistors as a traditional processor while consuming up to 2000 times less power. Thus, the development of neuromorphic chips is directed to provide a chip with vast processing capabilities that consumes far less power than conventional processors. Further, neuromorphic chips are designed to support dynamic learning in the context of complex and unstructured data.

There is an ongoing need for the development and enhancement of special-purpose processing capabilities such as that found in, for example, keyword detectors for hands-free operation of mobile devices, speaker recognition, and image recognition. Provided herein are systems and methods for enhancing special-purpose processing capabilities for special-purpose processors operable as stand-alone processors utilizing a microcontroller interface.

SUMMARY

Disclosed herein is an integrated circuit for signal detection in an offline state, including a host processor configured to receive a signal stream, a neuromorphic co-processor including an artificial neural network that is configured to identify one or more target signals among one or more signals received from the host processor, and a communications interface between the host processor and the co-processor configured to transmit information therebetween.

In a further embodiment, the signal stream includes signals received by way of any of sensors comprised of any of infrared sensors, pressure sensors, temperature sensors, proximity sensors, motion sensors, fingerprint scanners, photo eye sensors, wireless signal antennae, and the like.

In another embodiment, the signal stream includes any of speech or non-verbal acoustic signals received by way of a microphone, and images types or classes received by a smart camera, and the like.

In a still further embodiment, the one or more target signals are comprised of any of spoken keywords, specific sounds, desired image types or classes, and signal patterns among sensor data, and the like.

In still another embodiment, the one or more target signals may be detected by way of a set of weights stored in a memory storage that is accessible to the integrated circuit.

In more embodiments, the set of weights includes a programmed file that is formed by way of training an external software model of the artificial neural network to recognize the one or more target signals.

In yet further embodiments, the offline state includes an absence of connectivity between the integrated circuit and an external communications network, such as the Internet, the cloud, and the like.

Further disclosed is a method for generating a weight file that causes an integrated circuit to detect desired user-specified signals, including listing desired target signals that may be detected by a signal detector, retrieving one or more signal databases that are comprised of standard target signals that may be detected by the signal detector, combining the desired target signals and the one or more signal databases to build a modified database, using the modified database to train a neural network implementation to recognize the target signals and the standard signals, producing a set of weights by way of training the neural network implementation, and translating the set of weights into the weight file suitable for being stored in a memory storage that is accessible to the integrated circuit.

In additional embodiments, listing includes entering the target signals into a web-based application that is configured to generate the weight file.

In yet further embodiments, listing includes entering the target signals into a cloud-based application that is configured to generate the weight file.

In still more embodiments, listing includes entering the target signals into a stand-alone software that is configured to generate the weight file.

In certain embodiments, the target signals are comprised of signal patterns within input signals received by way of one or more sensors comprised of any of infrared sensors, pressure sensors, temperature sensors, proximity sensors, motion sensors, fingerprint scanners, photo eye sensors, wireless signal antennae, and the like.

In a variety of embodiments, the target signals may be any type of signal that an end-user wants to detect.

In a number of embodiments, the target signals may be spoken keywords, non-verbal acoustic signals such as specific sounds, image types or classes to be detected by a smart camera, and the like.

In yet additional embodiments, combining includes labeling the target signals with corresponding labels and labeling all other signals by way of a generic label.

In still yet more embodiments, the neural network implementation is a software model of a neural network that is implemented in the integrated circuit including the signal detector.

In further additional embodiments, the weight file may be provided to an end-user upon purchasing a mobile device.

In still yet further embodiments, the weight file may be programmed into one or more chips that may be purchased by an end-user for use in a mobile device.

In more further embodiments, upon an end-user installing the weight file the mobile device, the signal detector may detect the target signals by way of the set of weights.

Yet further embodiments disclosed herein, the signal detector continues detecting the target signals in an offline state comprised of an absence of connectivity between the signal detector and an external communications network, such as the Internet, the cloud, and the like.

BRIEF DESCRIPTION OF THE DRAWINGS

The drawings refer to embodiments of the present disclosure in which.

Figure 1:
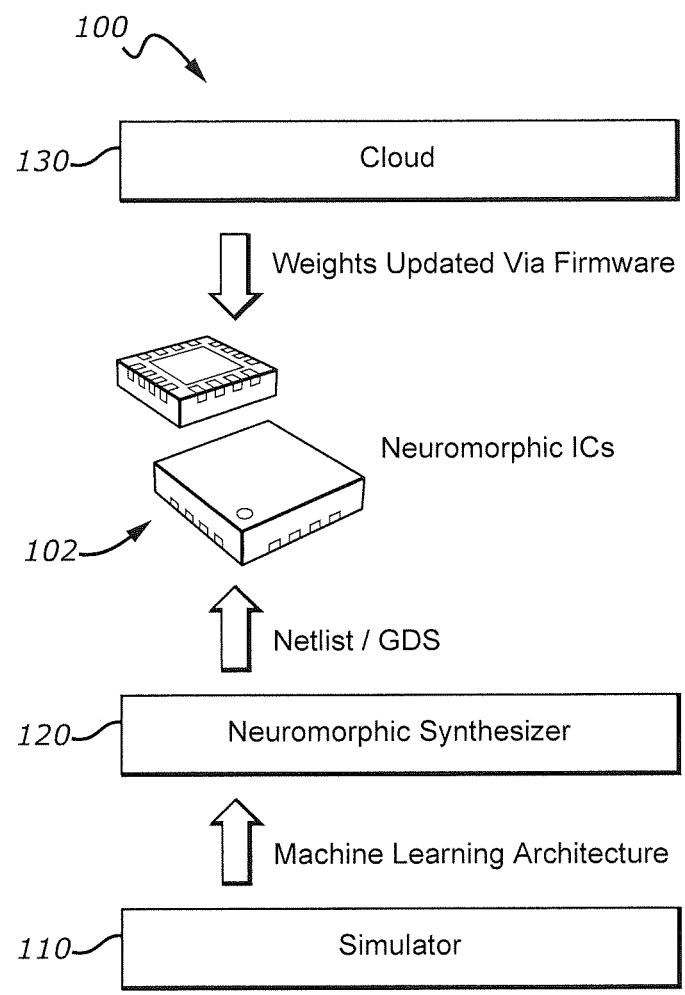
FIG. 1 provides a schematic illustrating an exemplary embodiment of a system for designing and updating neuromorphic integrated circuits ("ICs") in accordance with some embodiments.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, certain terminology is used to describe features of the invention. For example, in certain situations, the term "logic" may be representative of hardware, firmware and/or software that is configured to perform one or more functions. As hardware, logic may include circuitry having data processing or storage functionality. Examples of such circuitry may include, but are not limited or restricted to a microprocessor, one or more processor cores, a programmable gate array, a microcontroller, a controller, an application specific integrated circuit, wireless receiver, transmitter and/or transceiver circuitry, semiconductor memory, or combinatorial logic.

The term "process" may include an instance of a computer program (e.g., a collection of instructions, also referred to herein as an application). In one embodiment, the process may be included of one or more threads executing concurrently (e.g., each thread may be executing the same or a different instruction concurrently).

The term "processing" may include executing a binary or script, or launching an application in which an object is processed, wherein launching should be interpreted as placing the application in an open state and, in some implementations, performing simulations of actions typical of human interactions with the application.

The term "object" generally refers to a collection of data, whether in transit (e.g., over a network) or at rest (e.g., stored), often having a logical structure or organization that enables it to be categorized or typed. Herein, the terms "binary file" and "binary" will be used interchangeably.

The term "file" is used in a broad sense to refer to a set or collection of data, information or other content used with a computer program. A file may be accessed, opened, stored, manipulated or otherwise processed as a single entity, object or unit. A file may contain other files, and may contain related or unrelated contents or no contents at all. A file may also have a logical format, and/or be part of a file system having a logical structure or organization of plural files. Files may have a name, sometimes called simply the "filename," and often appended properties or other metadata. There are many types of files, such as data files, text files, program files, and directory files. A file may be generated by a user of a computing device or generated by the computing device. Access and/or operations on a file may be mediated by one or more applications and/or the operating system of a computing device. A filesystem may organize the files of the computing device of a storage device. The filesystem may enable tracking of files and enable access of those files. A filesystem may also enable operations on a file. In some embodiments the operations on the file may include file creation, file modification, file opening, file reading, file writing, file closing, and file deletion.

The term "host processor" includes a primary processor such as a CPU or digital signal processor (DSP) of an IC in a system. The host processor is one that can stand alone but benefits from addition of neuromorphic computing provided by a neuromorphic IC or processor thereof through the microcontroller interface.

The term "co-processor" includes an additional processor interfaced with the host processor through a microcontroller interface. The additional processor can be configured to perform functions not possible with the host processor alone or functions the co-processor can perform faster or at lower power.

The term "enhancement filter" includes a filter configured to suppress undesired noise in a signal by selectively attenuating or boosting certain components of the signal on a time-varying basis. Likewise, "enhancement filtering" includes filtering to suppress undesired noise in a signal by selectively attenuating or boosting certain components of the signal on a time-varying basis.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Referring now to FIG. 1, a schematic illustrating a system 100 for designing and updating neuromorphic ICs is provided in accordance with some embodiments. As shown, the system 100 can include a simulator 110, a neuromorphic synthesizer 120, and a cloud 130 configured for designing and updating neuromorphic ICs such as neuromorphic IC 102. As further shown, designing and updating neuromorphic ICs can include creating a machine learning architecture with the simulator 110 based on a particular problem. As those skilled in the art can appreciate, cloud-based computer system may include, but are not limited to systems that can provide software as a service ("SaaS"), platform as a service ("PaaS"), and or infrastructure as a service ("IaaS") resources. The neuromorphic synthesizer 120 can subsequently transform the machine learning architecture into a netlist directed to the electronic components of the neuromorphic IC 102 and the nodes to which the electronic components are connected. In addition, the neuromorphic synthesizer 120 can transform the machine learning architecture into a graphic database system ("GDS") file detailing the IC layout for the neuromorphic IC 102. From the netlist and the GDS file for the neuromorphic IC 102, the neuromorphic IC 102, itself, can be fabricated in accordance with current IC fabrication technology. Once the neuromorphic IC 102 is fabricated, it can be deployed to work on the particular problem for which it was designed. While the initially fabricated neuromorphic IC 102 can include an initial firmware with custom synaptic weights between the nodes, the initial firmware can be updated as needed by the cloud 130 to adjust the weights. Being as the cloud 130 is configured to update the firmware of the neuromorphic IC 102, the cloud 130 is not needed for everyday use.

Neuromorphic ICs such as the neuromorphic IC 102 can be up to 100× or more energy efficient than graphics processing unit ("GPU") solutions and up to 280× or more energy efficient than digital CMOS solutions with accuracies meeting or exceeding comparable software solutions. This makes such neuromorphic ICs suitable for battery powered applications.

Neuromorphic ICs such as the neuromorphic IC 102 can be configured for application specific standard products ("ASSP") including, but not limited to, keyword detection, voice recognition, sound identification, one or more audio filters, gesture recognition, image recognition, video object classification and segmentation, or autonomous vehicles including drones. For example, if the particular problem is one of detecting keywords, the simulator 110 can create a machine learning architecture with respect to one or more aspects of spoken word identification. The neuromorphic synthesizer 120 can subsequently transform the machine learning architecture into a netlist and a GDS file corresponding to a neuromorphic IC for word identification, which can be fabricated in accordance with current IC fabrication technology. Once the neuromorphic IC for word identification is fabricated, it can be deployed to work on spotting instances of keywords in or with, for example, a mobile device as detailed further herein.

Neuromorphic ICs such as the neuromorphic IC 102 can be deployed in toys, sensors, wearables, augmented reality ("AR") systems or devices, virtual reality ("VR") systems or devices, mobile systems or devices, appliances, Internet-of-things ("IoT") devices, or hearing systems or devices.

Figure 2:
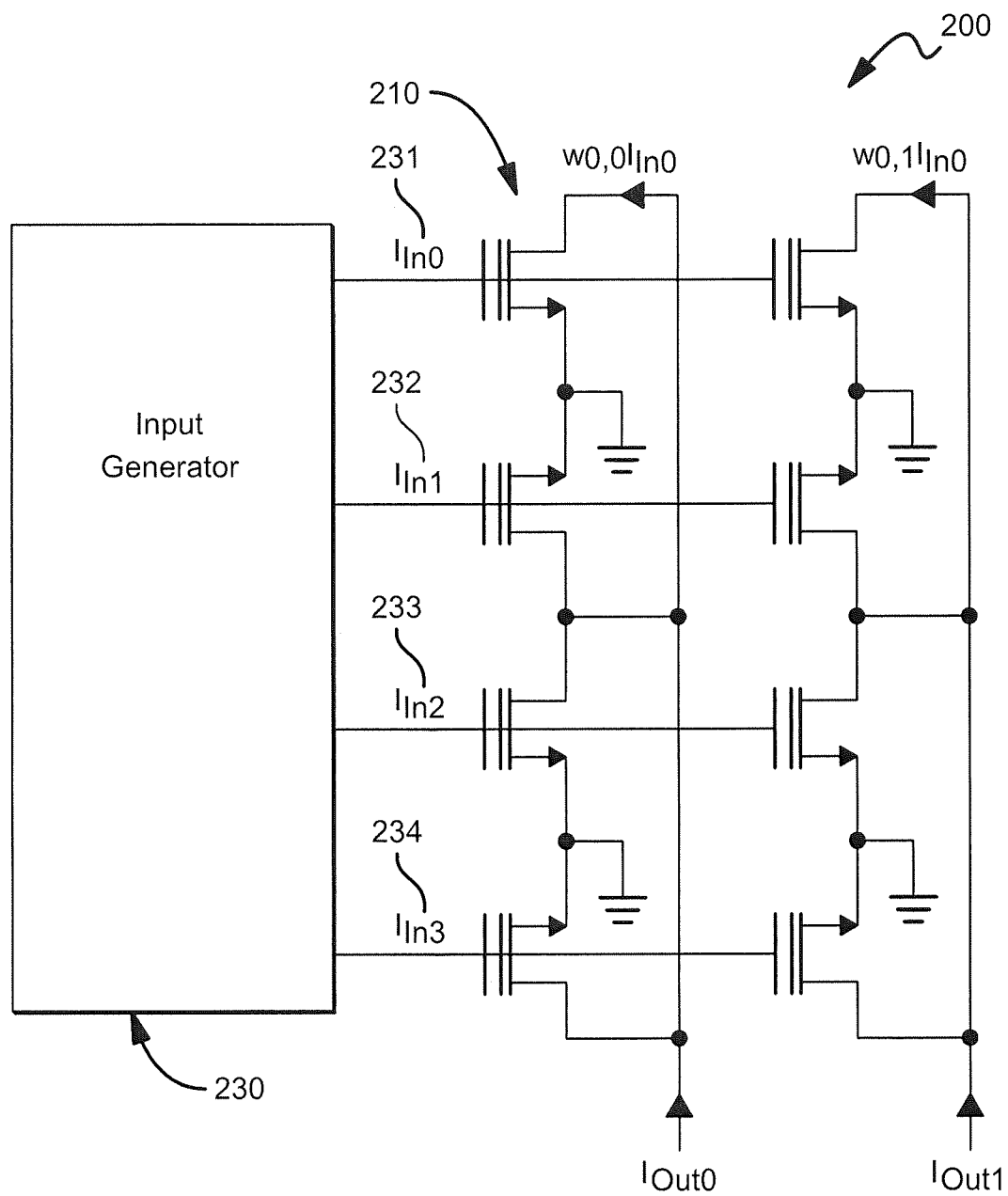
FIG. 2 provides a schematic illustrating an exemplary embodiment of an analog multiplier array in accordance with some embodiments.

Referring now to FIG. 2, a schematic illustrating an analog multiplier array 200 is provided in accordance with some embodiments. Such an analog multiplier array can be based on a digital NOR flash array in that a core of the analog multiplier array can be similar to a core of the digital NOR flash array or the same as a core of the digital NOR flash array. That said, at least select and read-out circuitry of the analog multiplier array are different than a digital NOR array. For example, output current is routed as an analog signal to a next layer rather than over bit lines going to a sense-amp/comparator to be converted to a bit. Word-line analogs are driven by analog input signals rather than a digital address decoder. Furthermore, the analog multiplier array 200 can be used in neuromorphic ICs such as the neuromorphic IC 102. For example, a neural network can be disposed in the analog multiplier array 200 in a memory sector of a neuromorphic IC.

Since the analog multiplier array 200 is an analog circuit, input and output current values (or signal values) can vary in a continuous range instead of simply on or off. This is useful for storing weights, or coefficients, of a neural network as opposed to digital bits. In operation, of certain embodiments, the weights are multiplied in a core by input current values 231, 232, 233, 234 to provide output current values that are combined to arrive at a decision of the neural network. Further, the analog multiplier array 200 can utilize standard programming and erase circuitry to generate tunneling and erase voltages. In many embodiments, the input current values 231, 232, 233, 234 are provided by an input generator 230. Those skilled in the art will recognize that such input current values can be generated or obtained from a variety of devices or other components within the system. Furthermore, stored charge within a multiplier 210 can shift voltage on the floating gate and scales drain current by weight $w_{i,j}$.

Figure 3:
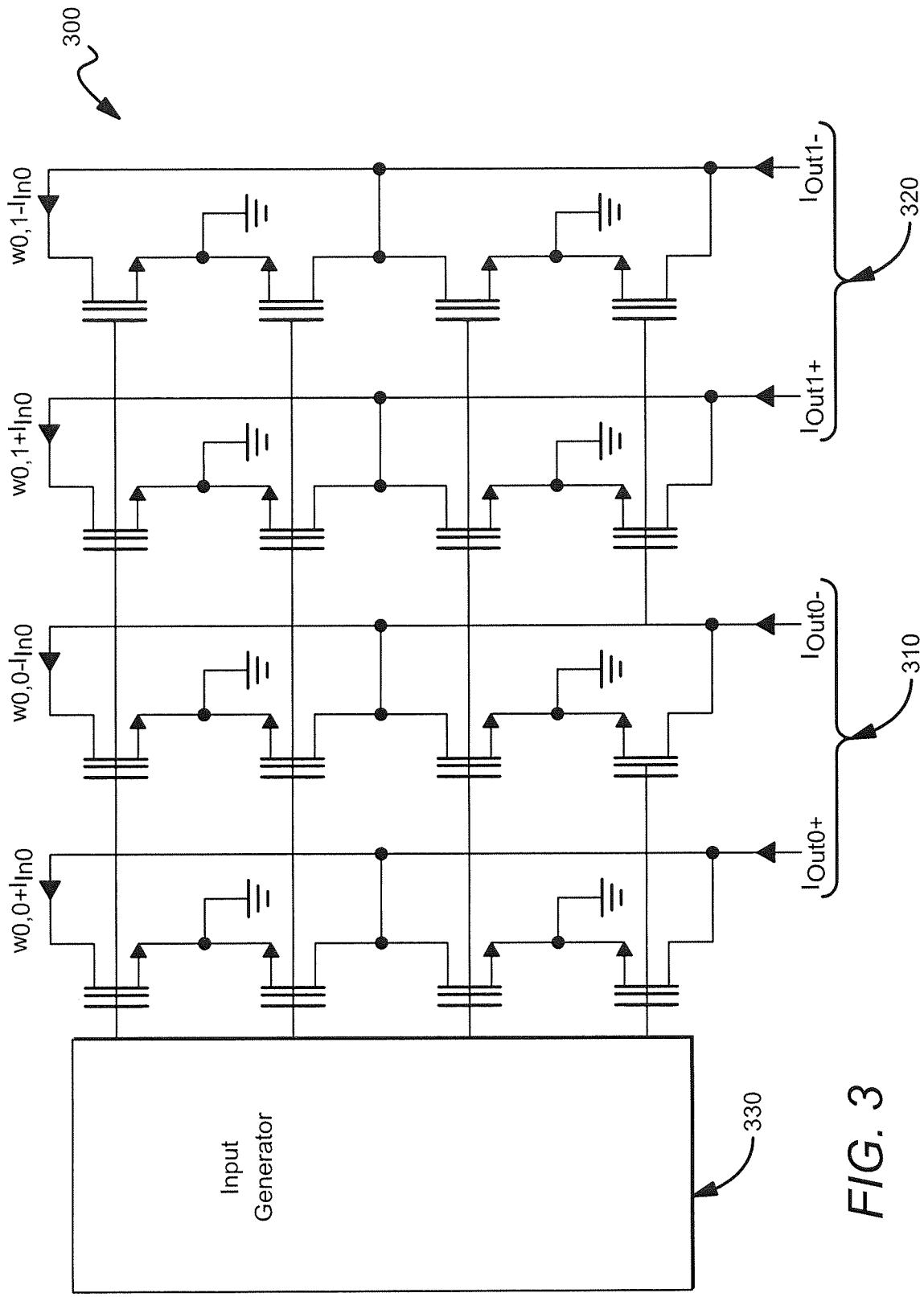
FIG. 3 provides a schematic illustrating an exemplary embodiment of an analog multiplier array in accordance with some embodiments.

Referring now to FIG. 3, a schematic illustrating an analog multiplier array 300 is provided in accordance with some embodiments. The analog multiplier array 300 can use two transistors (e.g., a positive transistor and a negative transistor) such as, but not limited to a metal-oxide semiconductor field effect transistor ("MOSFET") or field-effect transistor ("FET") to perform a two-quadrant multiplication of a signed weight (e.g., a positive weight or a negative weight) and a non-negative input current value. In many embodiments, the input current values can be provided by a separate input generator 330. The input generator 330 can be similar to that of the input generator depicted in FIG. 2 in certain embodiments. If an input current value provided by the input generator 330 is multiplied by a positive or negative weight, the product or output current value can respectively be either positive or negative. A positively weighted product can be stored in a first column (e.g., column corresponding to $I_{Out0+}$ in the analog multiplier array 300), and a negatively weighted product can be stored in a second column (e.g., column corresponding to $I_{Out0-}$ in the analog multiplier array 300). By way of example and not limitation, $I_{Out0+}$ and $I_{Out0-}$ can be taken as a differential current output 310 that then is provided to a plurality of current-sensing circuitry including, but not limited to, current mirrors, charge integrators, and/or transimpedance amplifiers. The foregoing differential outputs 310, 320 can provide positively and negatively weighted products or output signal values can be taken as a differential current value to provide useful information for making a decision.

Because each output current from the positive or negative transistor is wired to ground and proportional to the product of the input current value and the positive or negative weight, respectively, the power consumption of the positive or negative transistor is at or near zero when the input current values or weights are at or near zero. That is, if the input signal values are '0,' or if the weights are '0,' then no power will be consumed by the corresponding transistors of the analog multiplier array 300. This is significant because in many neural networks, often a large fraction of the values or the weights are '0,' especially after training. Therefore, energy is saved when there is nothing to do or going on. This is unlike differential pair-based multipliers, which consume a constant current (e.g., by means of a tail bias current) regardless of the input signal.

Figure 4A:
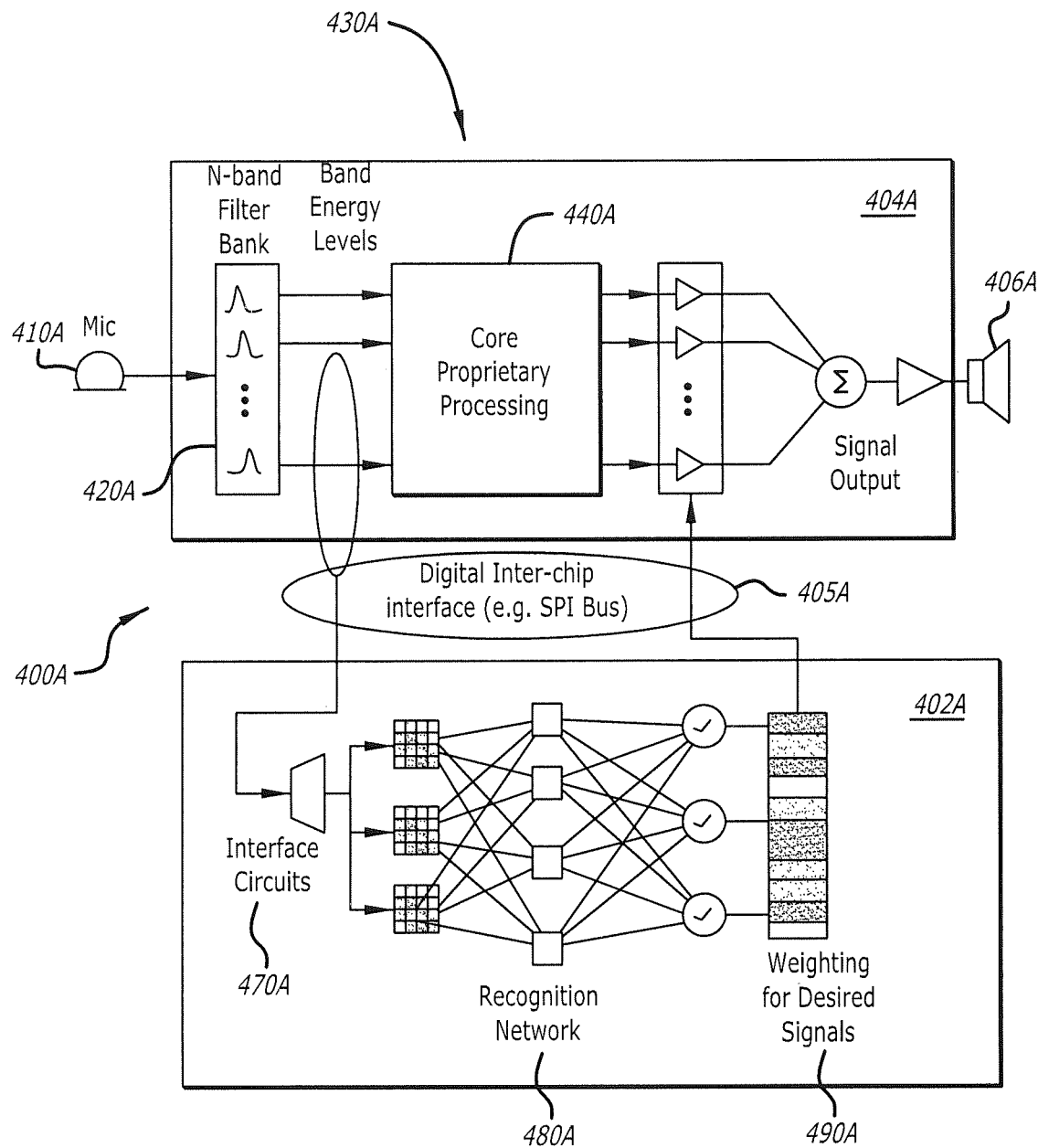
FIG. 4A provides a schematic illustrating an exemplary embodiment of a microcontroller interface between a co-processor of a neuromorphic IC and a host processor of a special-purpose IC in accordance with some embodiments.

Referring now to FIG. 4A, a schematic is provided illustrating a microcontroller interface 405A between a neuromorphic IC 402A and a host processor of a special-purpose IC 404A in accordance with some embodiments. While the neuromorphic IC 402A and the special-purpose IC 404A are shown as two distinct ICs in FIG. 4A, it should be understood that the foregoing ICs can alternatively be embodied in a single monolithic IC. As such, description regarding the microcontroller interface 400A between the co-processor of the neuromorphic IC 402A and the host processor of the special-purpose IC 404A should also be taken to describe the microcontroller interface 405A between a neuromorphic co-processor within the neuromorphic IC and special-purpose host processor of a single monolithic IC; that is, unless context clearly indicates otherwise.

As shown in FIG. 4A, the special-purpose IC 404A can include, but is not limited to, an IC for speech recognition systems or devices including keyword spotters, speaker identification systems, or image detection systems. In an embodiment, an IC for a keyword spotter 430A can include a keyword identifier host processor 440A (see "Core Proprietary Processing" in FIG. 4A) comprising the special-purpose host processor 404A, as well as a microphone 410A, a filter bank 420A, and a signal output to a speaker 406A. In an embodiment, illustrated in FIG. 4B, an IC for an image detection system 400B can include an image detection host processor 408B as the special-purpose host processor, an image generating device and/or data source 410B, a filter bank 420B, and a signal output to a computing device 426B which may include both personal and mobile computing devices. However, it should be understood that the neuromorphic co-processor can be interfaced with any one or more of a number of special-purpose host processors. The foregoing embodiments of the neuromorphic co-processor interfaced with the keyword identifier host processor or the image detection host processor are merely provided for exposition. It should be understood that extension to other ASSPs might need certain modifications in line with the specific functions of the other ASSPs.

As shown in FIG. 4A, in the case of speech recognition, the neuromorphic IC 402A or a portion of the above-referenced single monolithic IC corresponding to the neuromorphic IC 402A may include, but is not limited to, interface circuits, a deep-speech enhancement network with cloud-updateable synaptic weights, and a database of desired keywords. In some embodiments, the synaptic weights may be stored on a non-volatile memory, such as a flash memory or other suitable medium, that is accessible to the neuromorphic IC 402A. Again, the special-purpose IC 404A or a portion of the above-referenced single monolithic IC corresponding to the special-purpose IC 404A may include, but is not limited to, the keyword identifier host processor 440A, the microphone 410A, the filter bank 420A, and the signal output to a speaker 406A or other suitable analog and/or digital output. The neuromorphic IC 402A and the special-purpose IC 404A can be configured to communicate over a digital inter-chip interface 405A such as a serial peripheral interface ("SPI") bus or inter-integrated circuit ("I²C") bus.

The keyword identifier host processor 440A can be configured to transmit frequency elements or signal spectrum information in the form of Fourier transforms or similar frequency decompositions over the SPI bus 405A to the neuromorphic co-processor for audio signal-processing tasks such as audio enhancement or de-noising. The neuromorphic IC 402A may receive these tasks via interface circuits 470A. The neuromorphic co-processor can be configured to subsequently perform word recognition tasks via a recognition network 480A and transmit results back over the SPI bus 405A to the keyword identifier host processor 440A. The word recognition tasks may generate weighting data for desired signals 490A which may also be utilize and/or stored for future use. In some embodiments, the neuromorphic co-processor may have access to a database comprising a list of keywords whereby spoken keywords may be identified. In some embodiments, the results sent back to the keyword identifier host processor 440A may include weighting signals for desired words that are detected. The keyword identifier host processor 440A may be configured to subsequently transmit one or more signals indicating detection of a desired keyword. In some embodiments, the one or more signals may be comprised of signals that are sent to other special purpose ICs that are configured to perform specific tasks when desired keywords are detected. In a number of embodiments, the synaptic weights of the recognition network 480A can be updated either periodically or in response to a manual update process. In further embodiments, the synaptic weights may be modified dynamically based on feedback given by the user and/or system.

Figure 4B:
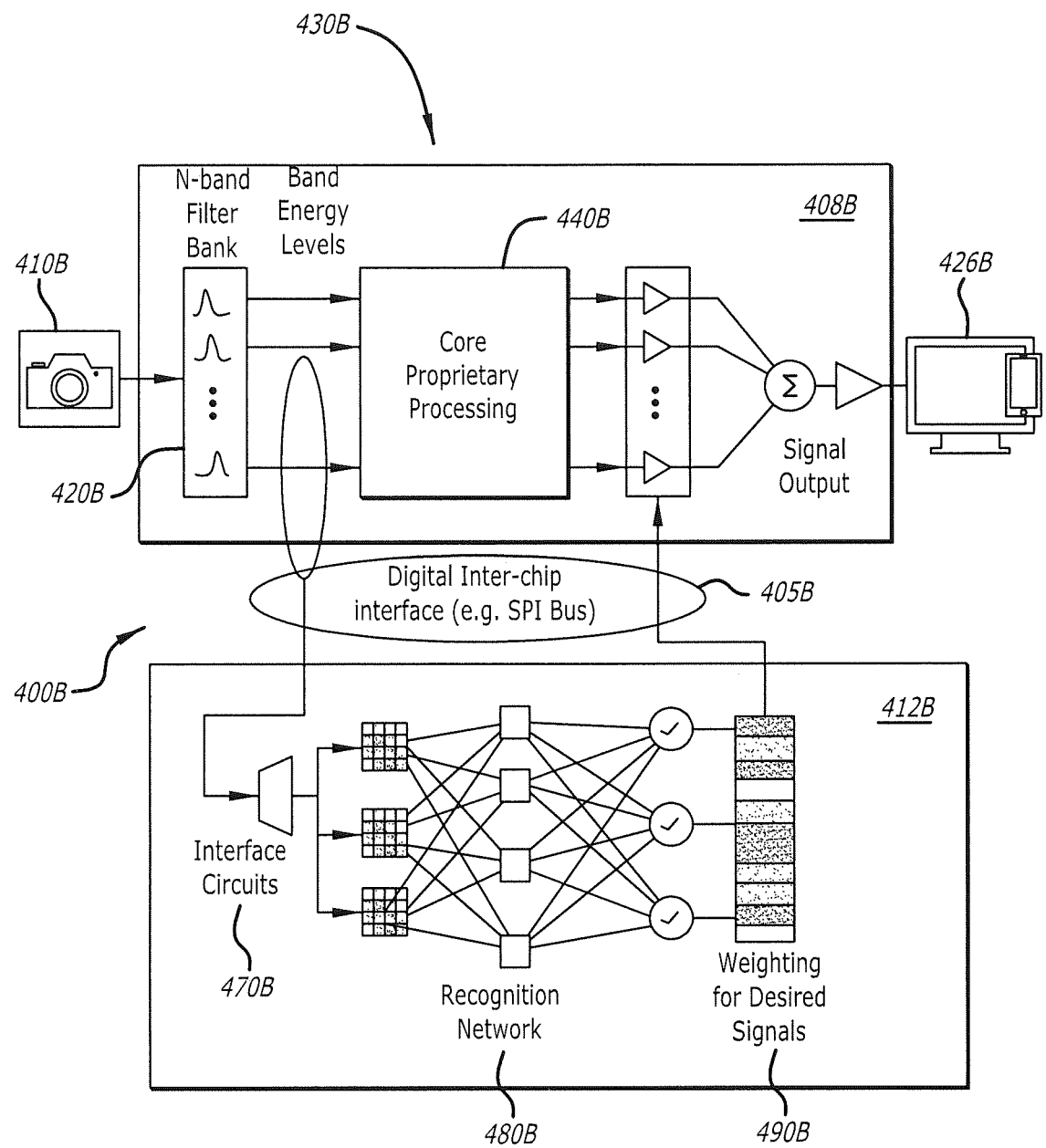
FIG. 4B is a schematic illustrating an exemplary embodiment of an image detection system that includes an image detection host processor and a co-processor of a neuromorphic IC, according to some embodiments.

As mentioned above, in an embodiment illustrated in FIG. 4B, an IC for an image detection system 400B may be comprised of an image detection host processor 408B as the special-purpose host processor, an image generating device and/or data source 410B, and a signal output to a computing device 426B such as, but not limited to, a personal computer and/or mobile device. In many embodiments, an IC for a image spotter 430B can include a keyword identifier host processor 440B (see "Core Proprietary Processing" in FIG. 4B) The image detection host processor 408B can be configured to transmit frequency elements or signal spectrum information in the form of Fourier transforms or similar frequency decompositions over the SPI bus 405B to the neuromorphic IC 412B for image-processing tasks such as detecting images classes. The neuromorphic IC 412B may receive these tasks via interface circuits 470B. The neuromorphic IC 412B can be configured to subsequently perform image recognition tasks via a recognition network 480B and transmit results back over the SPI bus 405B to the image detection host processor 408B. The word recognition tasks may generate weighting data for desired signals 490B which may also be utilize and/or stored for future use. In some embodiments, the neuromorphic IC 412B may have access to a database comprising a list of desired images whereby images detected by way of the image generating device and/or data source 410B may be identified. In some embodiments, the results sent back to the image detection host processor 408B may include weighting signals for desired images that are detected. The image detection host processor 408B may be configured to subsequently transmit one or more signals indicating detection of a desired image. As shown in FIG. 4B, the signals may be transmitted to the computing device 426B. In other embodiments, the signal output may be routed to another device or input for further processing. The computing device 426B may by, but is not limited to, any of a desktop, a tablet, a server, a mobile phone, a media player, a personal digital assistant (PDA), a personal communicator, a gaming device, a network router or hub, a wireless access point (AP) or repeater, a set-top box, or a combination thereof. In some embodiments, the one or more signals may be comprised of signals that are sent to other special purpose ICs that are configured to perform specific tasks when desired images are captured by the camera 416.

Figure 4C:
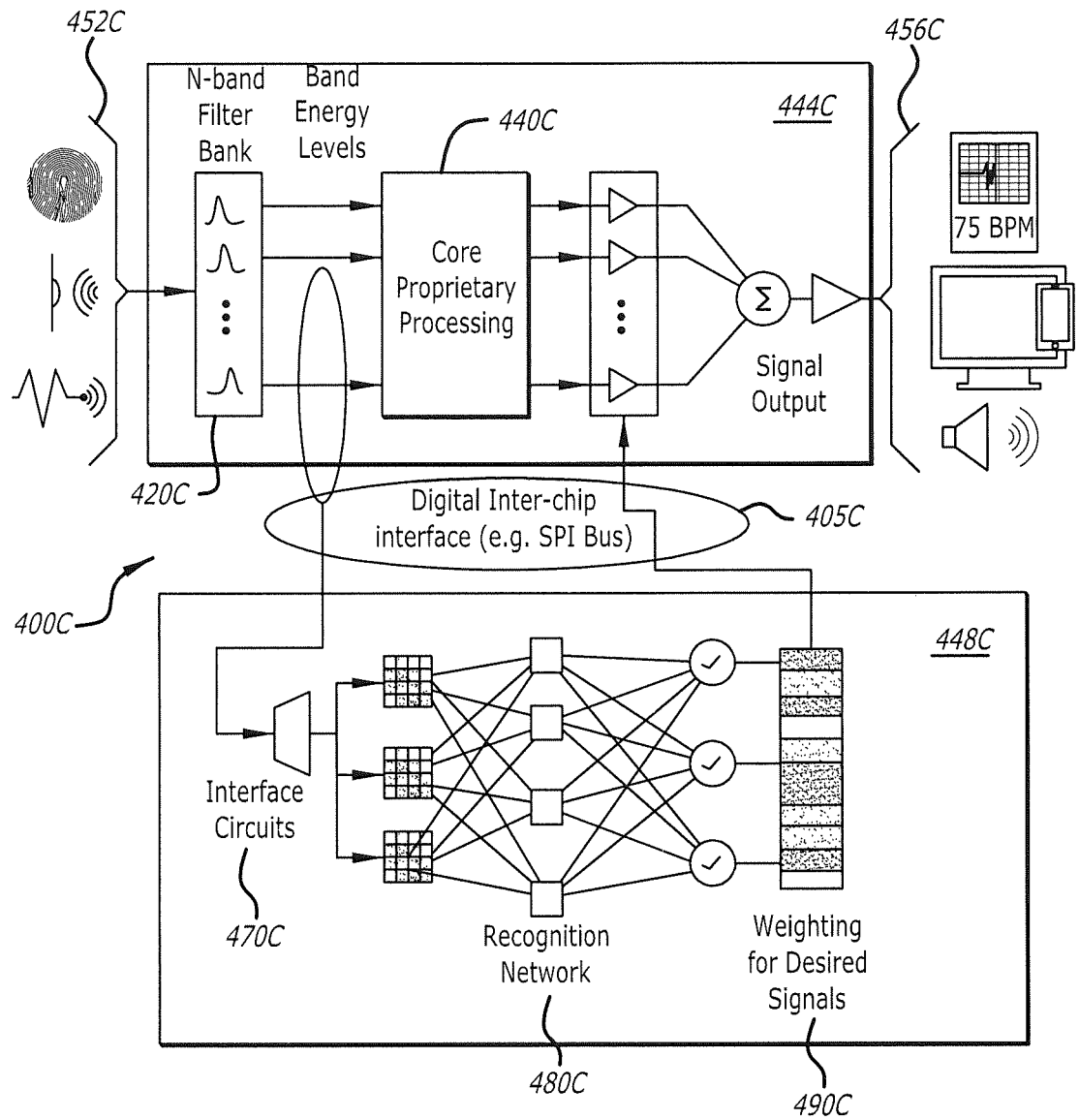
FIG. 4C is a schematic illustrating an exemplary embodiment of a generalized detection system that includes a pattern detection host processor and a co-processor of a neuromorphic IC, in accordance with some embodiments.

It should be understood, however, that the ICs described hereinabove are not to be limited to detecting sounds and images as discussed with respect to FIGS. 4A and 4B. For example, FIG. 4C provides a schematic illustrating an exemplary embodiment of a generalized detection system 400C that includes a pattern detection host processor 444C as the special-purpose IC and a neuromorphic IC 448C, in accordance with some embodiments. The patterns to be detected may be among the input signals received from a variety of different sensors 452C. In many embodiments, the pattern detection host processor 444C, may comprise a filter bank 420C, a signal identifier host processor 440C (see "Core Proprietary Processing" in FIG. 4C, and a signal output to a plurality of devices 456C. As shown in FIG. 4C, the sensors 452C may be comprised of any of infrared sensors, pressure sensors, temperature sensors, proximity sensors, motion sensors, fingerprint scanners, photo eye sensors, wireless signal antennae, and the like. Those skilled in the art will recognize that the type of input is not limited to the foregoing list, but may be comprised of any type of signal that may contain detectable patterns.

Similar to the host processors discussed hereinabove, the pattern detection host processor 444C may transmit frequency elements or signal spectrum information in the form of Fourier transforms or similar frequency decompositions over the SPI bus 405C to the neuromorphic IC 448C for processing tasks such as detecting desired patterns among the input signals. The neuromorphic IC 448C may receive these tasks via interface circuits 470C. The neuromorphic IC 448C may be configured to perform pattern recognition tasks via a recognition network 480C and transmit results back over the SPI bus 405C to the pattern detection host processor 444C. The word recognition tasks may generate weighting data for desired signals 490C which may also be utilize and/or stored for future use. It is contemplated that a database comprising a list of known patterns may be accessible to the neuromorphic IC 448C whereby desired patterns may be detected among the input signals received from the pattern detection host processor 444C. In some embodiments, results of the pattern recognition tasks that are sent back to the pattern detection host processor 444C may include weighting signals for desired patterns that are detected by way of the sensors 452C.

Once desired patterns are detected, the pattern detection host processor 444C may subsequently transmit one or more output signals indicating that desired patterns have been detected. The output signals may be transmitted to a device 456C comprising any of a desktop, a tablet, a server, a mobile phone, a media player, a personal digital assistant (PDA), a personal communicator, a gaming device, a network router or hub, a wireless access point (AP) or repeater, a set-top box, or any combination thereof. Further, in some embodiments, the device 456C may be comprised of other special-purpose ICs that are configured to perform specific tasks when desired patterns are captured by the sensors 452C.

It is contemplated that the special purpose ICs 404A, 408B, 444C and neuromorphic ICs 402A, 412B, 448C can be implemented in a single system or system on a chip ("SoC") configuration. It is also contemplated that certain embodiments may have either the special purpose ICs 404A, 408B, 444C and/or the neuromorphic ICs 402A, 412B, 448C implemented remotely with the digital inter-chip interface 405A, 405B, 405C being through a network connection.

Figure 5:
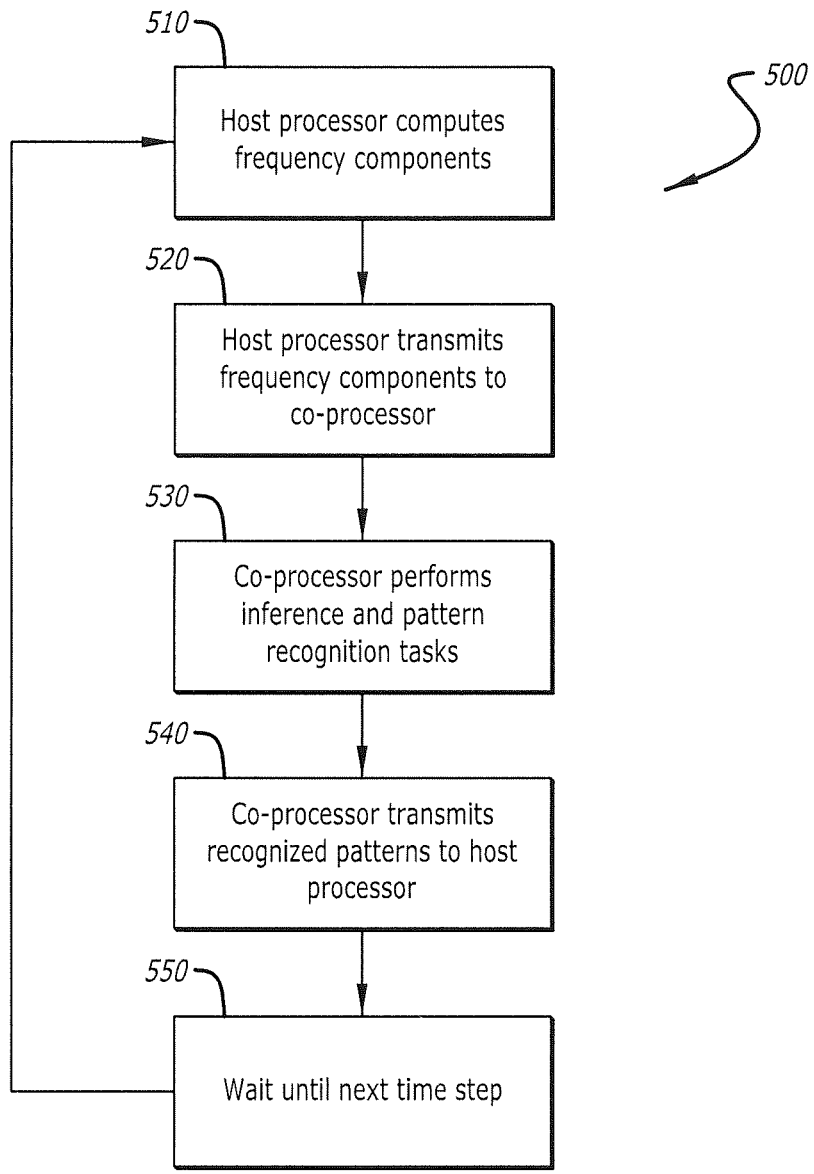
FIG. 5 provides a schematic illustrating an exemplary method of a neuromorphic IC for detecting signal patterns received by way of various sensors, in accordance with some embodiments.

Referring now to FIG. 5, a schematic is provided illustrating a method 500 of a neuromorphic IC for detecting signal patterns, received, for example, by way of the sensors 452C, in accordance with some embodiments. As shown, the method includes 1) a first step 510 where the pattern detection host processor computes frequency components; 2) a second step 520 where the pattern detection host processor transmits the frequency components to the neuromorphic co-processor; 3) a step 530 where the neuromorphic co-processor performs inference and identifies desired patterns from among the frequency components; 4) a step 540 where the neuromorphic co-processor transmits the identified patterns to the pattern detection host processor; and 5) a step 550 where the neuromorphic co-processor waits until the next time step.

It should be understood that the method 500 may be implemented to detect patterns among input signals received from a variety of different sensors, such as, by way of example and not limitation, the sensors 452C as depicted in FIG. 4C. As discussed with respect to FIG. 4C, the sensors 452C may be comprised of any of signal source including, but not limited to, infrared sensors, pressure sensors, temperature sensors, proximity sensors, motion sensors, fingerprint scanners, photo eye sensors, wireless signal antennae, any combination thereof, and the like. For example, in some embodiments, the method 500 may be implemented in a security capacity. In such embodiments, the first step 510 may be comprised of the pattern detection host processor identifying adverse sounds, such as an undesired intrusion into a restricted area. In step 530, the co-processor may perform sound recognition tasks, and then transmit recognized sounds to the pattern detection host processor in step 540. Upon detecting an adverse sound, therefore, the pattern detection host processor may output signals to other ICs that cause an alarm to sound.

Moreover, in some embodiments, the method 500 may be implemented in an image recognition capacity, whereby the first step 510 is comprised of the image detection host processor detecting types of images captured by way of the camera or other imaging device and/or data source, as discussed in connection with FIG. 4B. In step 530, the co-processor may perform tasks related to image recognition, and then transmit to the image detection host processor in step 540 whether desired images have been detected. In a security implementation, such as a facial recognition system, for example, upon detecting a desired image, or an image including desired properties, the image detection host processor may output signals to other ICs that unlock or disarm an alarm system.

Figure 6:
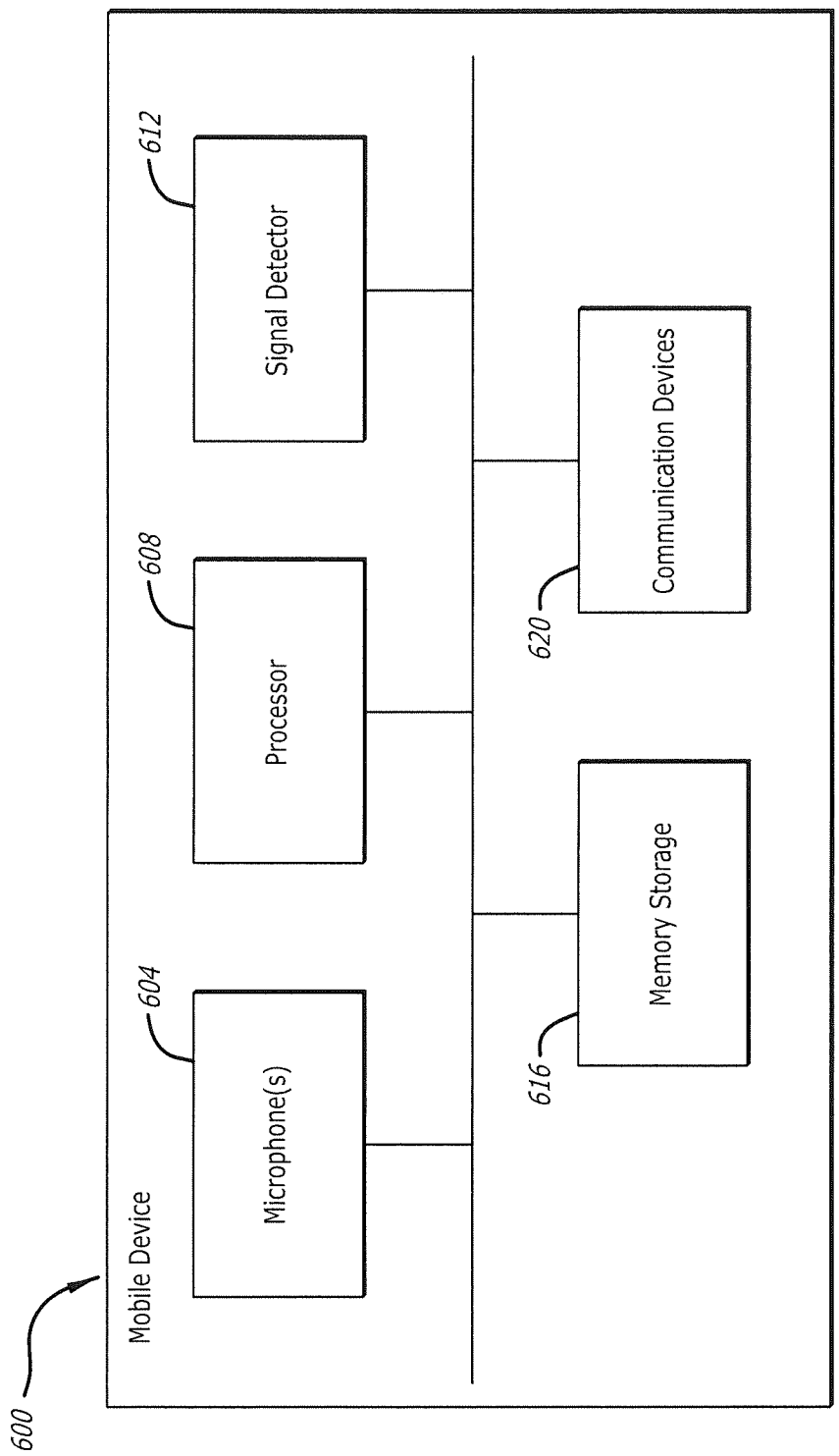
FIG. 6 provides a block diagram illustrating components comprising an exemplary mobile device that includes a signal detector in accordance with some embodiments.

FIG. 6 is a block diagram illustrating components of an exemplary mobile device 600 that may include a signal pattern detector, including, but not limited to a keyword spotter and/or an image detector as disclosed herein in connection with FIGS. 4A-4C. In the illustrated embodiment, the mobile device 600 may include one or more microphone(s) 604, at least one processor 608, a signal detector 612, a memory storage 616, and one or more communication devices 620. In some embodiments, the mobile device 600 may also include additional or other components necessary for operation of the mobile device 600. In some embodiments, the mobile device 600 may include fewer components that perform similar or equivalent functions to those described herein.

In some embodiments, acoustic signals, once received, for example, as captured by the microphone(s) 604, may be converted into electric signals, which, in turn, may be converted, by the signal detector 612, into digital signals for processing in accordance with some embodiments. The processed signals may be transmitted for further processing to the processor 608. In some embodiments, some of the microphones 604 may be digital microphone(s) operable to capture acoustic signals and output digital signals. Some of the digital microphone(s) may provide for voice activity detection, or vocalization detection, and buffering of the audio data significantly prior to the vocalization detection.

The signal detector 612 may be operable to process an acoustic signal. In some embodiments, the acoustic signal is captured by the microphone(s) 604. In some embodiments, acoustic signals detected by the microphone(s) 604 may be used by the signal detector 612 to separate desired speech (for example, keywords) from ambient noise, providing more robust automatic speech recognition (ASR).

In some embodiments, the signal detector 612 may comprise a neuromorphic IC and a special purpose IC such as those depicted in FIG. 4A. The signal detector 612 may be configured to transmit one or more signals indicating identification of desired keywords or other sounds. In some embodiments, the one or more signals may be sent to the processor 608 or other special purpose ICs that are configured to perform specific tasks when desired keywords or other sounds are identified. Thus, the signal detector 612 may be configured to provide hands-free operation of the mobile device 600.

In some embodiments, the signal detector 612 may be configured to remain in a low-power, always-on state whereby the signal detector 612 remains continuously ready to detect target information, such as specific keywords, specific speakers, or image classes. As will be recognized, conventional DSP detectors, such as keyword spotters, generally reside in a low-awareness, low-power state until something in the environment, such as speech, occurs and then the entire DSP is powered-on to full-power. With the entire DSP powered-on, the conventional DSP keyword spotter is then placed into a fully-aware state whereby keywords may be detected. In the case of word detection, however, the time required to switch the DSP from low-power to full-power leads to latency wherein the keyword spotter may miss the first one or more words. In some implementations, latency can lead to adverse results. For example, in the instance of a DSP detector that is configured for security, the time wasted due to latency may lead to a loss of crucial evidence regarding a crime that has been committed.

Unlike conventional DSP detectors, the signal detector 612 remains fully aware when the mobile device 600 is placed into a low-power state. The signal detector 612 is capable of detecting changes in the environment, such as speech, without taking time to power-on other components before detection may occur. Thus, the signal detector 612 is configured to detect keywords, or other sounds, with substantially zero latency. It is contemplated that the fully aware state of the signal detector 612 may be achieved by operating the signal detector within a power envelop that is insignificant to the rest of the components comprising the mobile device 600. In some embodiments, for example, the signal detector 612 may be implemented as the smallest component comprising the mobile device 600, such that the signal detector may be powered by current leakage from the battery. As such, when the components comprising the mobile device 600 are placed into a lower power, sleep mode, the signal detector 612 may continue operating in a fully aware state that is sustained by normal leakage current from the battery.

The processor 608 may include hardware and/or software operable to execute computer programs stored in the memory storage 616. The processor 608 may use floating point operations, complex operations, and other operations needed for implementations of embodiments of the present disclosure. In some embodiments, the processor 608 of the mobile device 600 may include, for example, at least one of a DSP, an image processor, an audio processor, a general-purpose processor, and the like.

The exemplary mobile device 600 may be operable, in various embodiments, to communicate over one or more wired or wireless communications networks, for example, via communication devices 620. In some embodiments, the mobile device 600 may send at least audio signals (speech) over a wired or wireless communications network. In some embodiments, the mobile device 600 may encapsulate and/or encode the at least one digital signal for transmission over a wireless network, such as a cellular network.

Moreover, it should be understood that the mobile device 600 in general, and the signal detector 612 in particular, are not to be limited to detecting keywords for hands-free operation of the mobile device. For example, in some embodiments, the mobile device 600 may be configured for a security-related implementation. As such, the mobile device 600 may be configured to detect previously defined adverse sounds, such as glass breaking, within a restricted area. Upon detecting an adverse sound, the signal detector 612 may be configured to output one or signals indicating to other components that the adverse sound has been detected. In some embodiments, for example, the signal detector 612 may trigger an alarm system upon detecting an adverse sound.

In some embodiments, the mobile device 600 may be configured to recognize images. For example, the signal detector 612 may be configured to process images captured by way of a camera comprising the mobile device 600. In a security implementation, such as a facial recognition system, the signal detector 612 may process images in search of images having predefined desired properties. Upon detecting an image possessing the desired properties, the signal detector 612 may output signals to other ICs that unlock or disarm an alarm system. It is contemplated that in some embodiments, such a security implementation may be facial recognition whereby upon detecting an image of a desired user's face, the signal detector 612 may send one or more signals to unlock or disarm a security system.

In an embodiment, the signal detector 612 is configured to operate in absence of an active connection to a communications network, such as the Internet or the cloud 130. As discussed in connection with FIG. 1, although the cloud 130 is configured to update the firmware of the signal detector 612, the cloud 130 may not be needed for everyday use of the signal detector 612. Those skilled in the art will appreciate that operating the signal detector 612 in an offline state, in absence of a connection to the cloud 130, is advantageously more secure than having an always-on connection to the cloud 130 or the Internet. For example, when the signal detector 612 is implemented in a security capacity, operating in the offline state prevents unwanted intrusion by way of connections from the cloud 130. Further, the capability to operate in the offline state facilitates implementing the signal detector 612 where a connection to the cloud 130 is not always available, such as when the signal detector is implemented in a hearing aid.

Preferably, machine learning may be done by way of a connection with the cloud 130, as disclosed with respect to FIG. 1. In an embodiment, synaptic weights may be downloaded and stored to a non-volatile memory, such as flash memory or the memory storage 616. The stored synaptic weights may be accessed by the signal detector 612 so as to enable differentiating between signals received by the signal detector 612 in absence of the connection to the cloud 130. As will be appreciated, differentiating between the signals may enable the signal detector 612 to recognized keywords, specific speakers, or classes of images, as desired.

In one embodiment, user-specific target information, such as specific keywords, specific speakers, or image classes, may be combined with an existing database to form a user-specific training set that may be used to train an existing neural network type model on the combined data to produce synaptic weights. A weight file may be generated and written into a chip that may execute user-specific functions associated with the target information.

Figure 7:
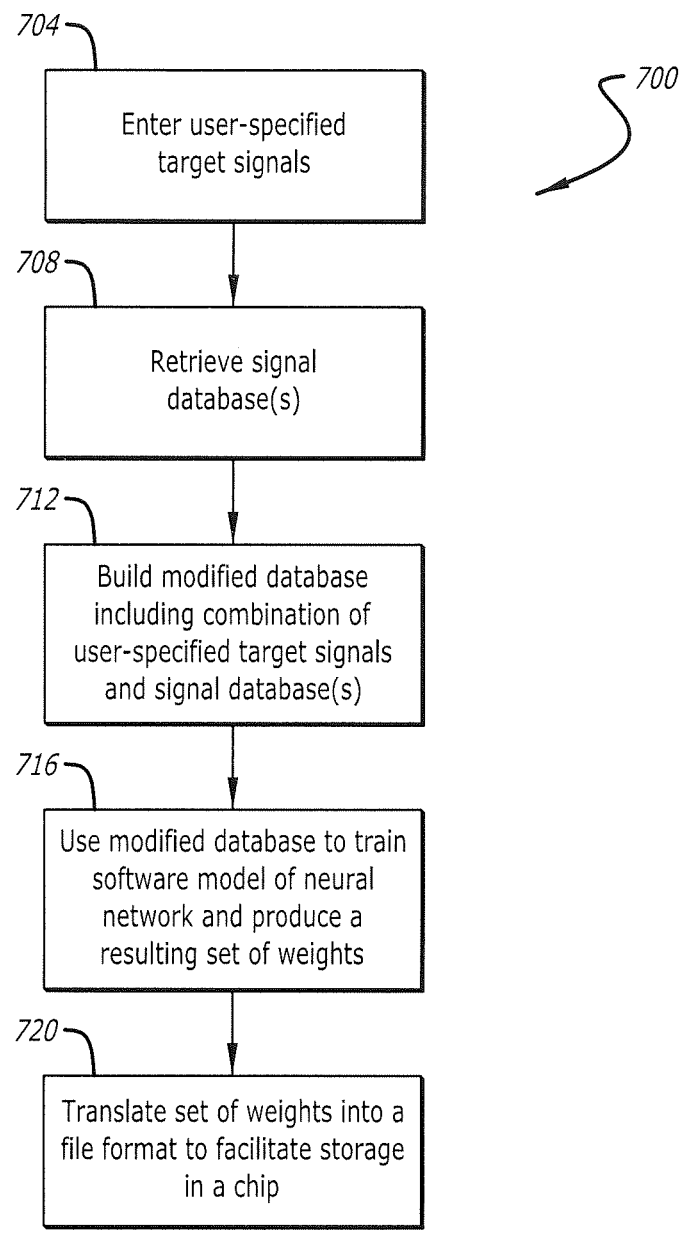
FIG. 7 is a schematic illustrating a method of generating a weight file that may be made available to a user for the purpose of executing desired user-specific functions in an offline state, according to the present disclosure.

FIG. 7 is a schematic illustrating a method 700 of generating a weight file that may be made available to a user for the purpose of executing desired user-specific functions. In an embodiment, the method 700 is performed by way of a web-based application, or other suitable software application. It is contemplated that the application may be a cloud-based application, or the application may be distributed as a stand-alone software, as desired. The method 700 may begin with a step 704 that enables the user, or a customer, to enter desired target signals into the application. User-specified target signals may be any type of signal that the user wants to detect. For example, the user-specified target signals may be spoken keywords, non-verbal acoustic signals such as specific sounds, image types or classes to be detected by a smart camera, and the like.

In an exemplary embodiment, wherein the signal detector 612 is a keyword spotter, the user may enter desired keywords in step 704. For example, the user may want the signal detector 612 to recognize personalized words, such as, by way of non-limiting example, "On," "Off," "Hotter", and "Colder," in addition to other, standard keywords that are already included in a keyword database.

In step 708, the application retrieves one or more signal databases that are comprised of target signals that may be detected by the signal detector 612. Continuing with the keyword spotter example, the signal databases may be comprised of standard keywords that may be detected by the signal detector 612, as described herein. In step 712, the user-specified target signals are combined with the one or more signal databases to build a modified database. In an embodiment, the user-specified target signals may be labeled with suitable, corresponding labels while all other signals may be identified by way of a generic label, such as "Other," for example.

The modified database may then be used to train a neural network implementation, in step 716, to recognize the signals that are included in the modified database. It is contemplated that the neural network implementation may be a software model of a neural network that is implemented in the hardware comprising the mobile device 600. Training the neural network implementation generates a set of weights that may be used by the signal detector 612 to detect the target signals in the modified database. In step 720, the set of weights produced by way of step 716 are translated into a file format suitable for being stored in the memory storage 616, or a flash memory, of the mobile device 600. In some embodiments, a programming file comprised of the set of weights may be provided to an end-user upon purchasing the mobile device 600. In some embodiments, the file may be programmed into one or more chips that may be purchased by the end-user.

Upon the end-user installing the file comprising the weights into the mobile device 600, either by way of the above-mentioned programming file or the chips, the signal detector 612 may detect the target signals specified in the modified database. As will be appreciated, therefore, since training of the neural network comprising the signal detector 612 is performed externally of the mobile device 600 and the resultant weights are stored in the memory storage 616, the signal detector 612 may continue detecting the target signals in the offline state, in absence of the cloud 130 or other network connections.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An integrated circuit for signal detection in an offline state, comprising:
    a host processor coupled with a co-processor and configured to receive a signal stream;
    wherein the signal stream comprises signals received by at least one of: an infrared sensor, a pressure sensor, a temperature sensor, a proximity sensor, a motion sensor, a fingerprint scanner, a photo eye sensor, a microphone, and a wireless signal antenna;
    the co-processor configured to perform one or more recognition tasks via a recognition network and transmit one or more results to the host processor;

wherein the co-processor includes a neural network configured to identify one or more target signals from the received signal stream; and wherein the one or more target signals may be detected using a set of weights in absence of a connection to an external communications network, wherein the host processor is configured to receive weighting signals from the co-processor, and transmit the one or more target signals indicating detection of desired user-specified signals.

2. The integrated circuit of claim 1, wherein the one or more target signals are comprised of any of spoken keywords, specific sounds, desired image types or classes, and signal patterns among sensor data.

3. The integrated circuit of claim 1, wherein the set of weights are stored in a memory storage that is accessible to the integrated circuit.

4. The integrated circuit of claim 1, wherein the set of weights comprises a programmed file that is formed by way of training an external software model of the artificial neural network to recognize the one or more target signals.

5. The integrated circuit of claim 1, wherein the offline state is comprised of an absence of connectivity between the integrated circuit and an external communications network, such as the Internet, the cloud.

6. A method for generating a weight file that causes an integrated circuit to detect desired user-specified signals, comprising:
  listing desired target signals that may be detected by a signal detector;
  retrieving one or more signal databases that are comprised of standard target signals that may be detected by the signal detector;
  combining the desired target signals and the one or more signal databases to build a modified database;
  using the modified database to train a neural network implementation to recognize the target signals and the standard signals;
  producing a set of weights by way of training the neural network implementation; and
  translating the set of weights into the weight file suitable for being stored in a memory storage that is accessible to the integrated circuit;
  receiving, by a host processor, the set of weights from a co-processor configured to perform one or more recognition tasks for the host processor and transmitting one or more signals indicating detection of the desired user-specific signals;
  wherein the weight file is used to detect the desired user-specific signals received from at least one of: an infrared sensor, a microphone, a pressure sensor, a temperature sensor, a proximity sensor, a motion sensor, a fingerprint scanner, a photo eye sensor, and a wireless signal antenna.

7. The method of claim 6, wherein listing comprises entering the target signals into a web-based application that is configured to generate the weight file.

8. The method of claim 6, wherein listing comprises entering the target signals into a cloud-based application that is configured to generate the weight file.

9. The method of claim 6, wherein listing comprises entering the target signals into a stand-alone software that is configured to generate the weight file.

10. The method of claim 6, wherein the target signals may be any type of signal that an end-user wants to detect.

11. The method of claim 6, wherein combining comprises labeling the target signals with corresponding labels and labeling all other signals by way of a generic label.

12. The method of claim 6, wherein the neural network implementation is a software model of a neural network that is implemented in the integrated circuit comprising the signal detector.

13. The method of claim 6, wherein the weight file may be provided to an end-user upon purchasing a mobile device.

14. The method of claim 6, wherein the weight file may be programmed into one or more chips that may be purchased by an end-user for use in a mobile device.

15. The method of claim 6, wherein upon an end-user installing the weight file the mobile device, the signal detector may detect the target signals by way of the set of weights.

16. The method of claim 15, wherein the signal detector continues detecting the target signals in an offline state comprised of an absence of connectivity between the signal detector and an external communications network, such as the Internet, the cloud.

17. A system for signal detection in an offline state, comprising:
  a host processor coupled with a co-processor and configured to receive a signal stream;
  wherein the one or more signals are received by at least one of: an infrared sensor, a microphone, a pressure sensor, a temperature sensor, a proximity sensor, a motion sensor, a fingerprint scanner, a photo eye sensor, and a wireless signal antenna;
  the co-processor configured to perform one or more recognition tasks and transmit one or more results to the host processor, the co-processor including an artificial neural network that is configured to identify one or more target signals among the one or more signals;
  wherein the one or more recognition tasks are performed using the artificial neural network;
  a communications interface between the host processor and the co-processor configured to transmit information therebetween; and
  wherein the one or more target signals may be identified using a set of weights, and wherein the host processor is configured to receive weighting signals from the co-processor, and transmit the one or more target signals indicating detection of desired user-specified signals.

* * * * *